United States Patent
Chien et al.

(10) Patent No.: US 12,200,410 B2
(45) Date of Patent: Jan. 14, 2025

(54) PROJECTION SYSTEM AND COLOR CALIBRATION METHOD THEREOF

(71) Applicant: Coretronic Corporation, Hsin-Chu (TW)

(72) Inventors: Chun-Lin Chien, Hsin-Chu (TW); Yu-Wen Lo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/841,693

(22) Filed: Jun. 16, 2022

(65) Prior Publication Data

US 2022/0408066 A1     Dec. 22, 2022

(30) Foreign Application Priority Data

Jun. 17, 2021    (CN) .......................... 202110671026.9

(51) Int. Cl.
*H04N 9/31*     (2006.01)

(52) U.S. Cl.
CPC ......... *H04N 9/3182* (2013.01); *H04N 9/3194* (2013.01)

(58) Field of Classification Search
CPC ........................... H04N 9/3182; H04N 9/3194
See application file for complete search history.

(56) References Cited

U.S. PATENT DOCUMENTS

| | | | | |
|---|---|---|---|---|
| 6,061,102 A | * | 5/2000 | Sheppard ................. | H04N 5/20 348/E5.073 |
| 2011/0148904 A1 | * | 6/2011 | Kotani ................... | G09G 3/006 345/589 |

(Continued)

FOREIGN PATENT DOCUMENTS

| | | |
|---|---|---|
| CN | 101860761 | 10/2010 |
| CN | 102026003 | 4/2011 |

(Continued)

OTHER PUBLICATIONS

"Office Action of China Counterpart Application", issued on Jun. 16, 2023, p. 1-p. 8.

(Continued)

*Primary Examiner* — John W Miller
*Assistant Examiner* — Humam M Satti
(74) *Attorney, Agent, or Firm* — JCIPRNET (57) ABSTRACT

A projection system and its color calibration method are provided. The projection system includes a projection device, a camera device, and a processing circuit. The projection device projects a calibration projection image including a plurality of calibration regions. The camera device captures the calibration projection image. The processing circuit performs a color calibration operation to calibrate color uniformity of the calibration projection image. The processing circuit drives the projection device to project the calibration projection image according to color gain values of the calibration regions. The processing circuit drives the camera device to capture the calibration projection image, calculates color values of the calibration regions, and updates the color gain values of the calibration regions to make the color values of the calibration regions approach at least one target value. The system and the method may automatically and adaptively calibrate the color uniformity of the calibration projection image.

16 Claims, 4 Drawing Sheets

(56) References Cited

U.S. PATENT DOCUMENTS

| | | | | |
|---|---|---|---|---|
| 2013/0194292 A1* | 8/2013 | Cho | ............... | H04N 9/3182 |
| | | | | 345/602 |
| 2017/0208309 A1* | 7/2017 | Oike | ............... | H04N 9/315 |
| 2021/0211620 A1* | 7/2021 | Han | ............... | H04N 9/3194 |

FOREIGN PATENT DOCUMENTS

| | | |
|---|---|---|
| CN | 102404533 | 4/2012 |
| CN | 102547306 | 7/2012 |
| CN | 102611822 | 7/2012 |
| CN | 103209311 | 7/2013 |
| CN | 104869377 | 8/2015 |
| CN | 106060491 | 10/2016 |
| CN | 106791737 | 5/2017 |
| CN | 103716504 | 1/2019 |
| CN | 109819225 | 5/2019 |
| CN | 112312106 | 2/2021 |
| JP | 2000316170 | 11/2000 |

OTHER PUBLICATIONS

Xu; Dongsheng et al., "Color Calibration Method for Images Taken by Different Imaging Conditions Which Suppresses False Color", 2021 2nd International Conference on Artificial Intelligence and Computer Engineering (ICAICE), Nov. 7, 2021, pp. 855-860.

Chen; Feng, "Research on Key Techniques and Applications of Color Correction for Multi-projector System", PhD thesis of Beijing Institute of Technology, with English abstract, Dec. 2015, pp. 1-124.

"Notice of allowance of China Counterpart Application", issued on May 30, 2024, p. 1-p. 5.

* cited by examiner

PROJECTION SYSTEM AND COLOR CALIBRATION METHOD THEREOF

CROSS-REFERENCE TO RELATED APPLICATION

This application claims the priority benefit of China patent application serial no. 202110671026.9, filed on Jun. 17, 2021. The entirety of the above-mentioned patent application is hereby incorporated by reference herein and made a part of this specification.

BACKGROUND OF THE INVENTION

Field of the Invention

The invention relates to a projection technology; more particularly, the invention relates to a projection system and a color calibration method thereof.

Description of Related Art

It is known that color uniformity of a projected image is adjusted by manually setting red, green, and blue (R/G/B) uniformity gain parameters of a specific region, so as to adjust color uniformity of the projected image of a projector. After determination with human eyes, a user manually changes RGB gain parameters of the projector. The uniformity adjustment need be done several times until certain effects are achieved, and whether the adjustment is made to an acceptable range can be determined merely through the human eyes, which is rather inconvenient for the user.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projection system and a color calibration method thereof to automatically and adaptively calibrate color uniformity of an image.

Other objectives and advantages of the invention may further be learned from technical features disclosed in the invention.

In order to achieve one or a part or all of the foregoing objectives or other objectives, an embodiment of the invention provides a projection system including a projection device, a camera device, and a processing circuit. The projection device is configured to project a calibration projection image, wherein the calibration projection image includes a plurality of calibration regions. The camera device is configured to capture the calibration projection image. The processing circuit is coupled to the projection device and the camera device. The processing circuit is configured to perform a color calibration operation to calibrate color uniformity of the calibration projection image. The processing circuit drives the projection device to project the calibration projection image according to at least one color gain value of each of the calibration regions. The processing circuit drives the camera device to capture the calibration projection image, calculates at least one color value of each of the calibration regions of the calibration projection image, and updates a color gain value of each of the calibration regions, so that the at least one color value of each of the calibration regions approaches at least one target value.

In order to achieve one or part or all of the above objects or other objects, an embodiment of the invention provides a color calibration method including a step of performing a color calibration operation by a processing device to calibrate color uniformity of the calibration projection image of the projection device. The color calibration operation includes: projecting the calibration projection image according to at least one color gain value of each of a plurality of calibration regions of the calibration projection image by the projection device; capturing the calibration projection image by the camera device; calculating at least one color value of each of the calibration regions of the calibration projection image by the processing device; and updating the at least one color gain value of each of the calibration regions, so that the at least one color value of each of the calibration regions approaches at least one target value.

Based on the above, one or more embodiments of the invention have at least one of the following advantages or effects. The projection system provided in one or more embodiments of the invention is capable of projecting the calibration projection image through the projection device and capturing the calibration projection image through the camera device. The processing circuit may perform the color calibration operation according to the calibration projection image. As such, the projection system may automatically and adaptively calibrate the color uniformity of the image.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
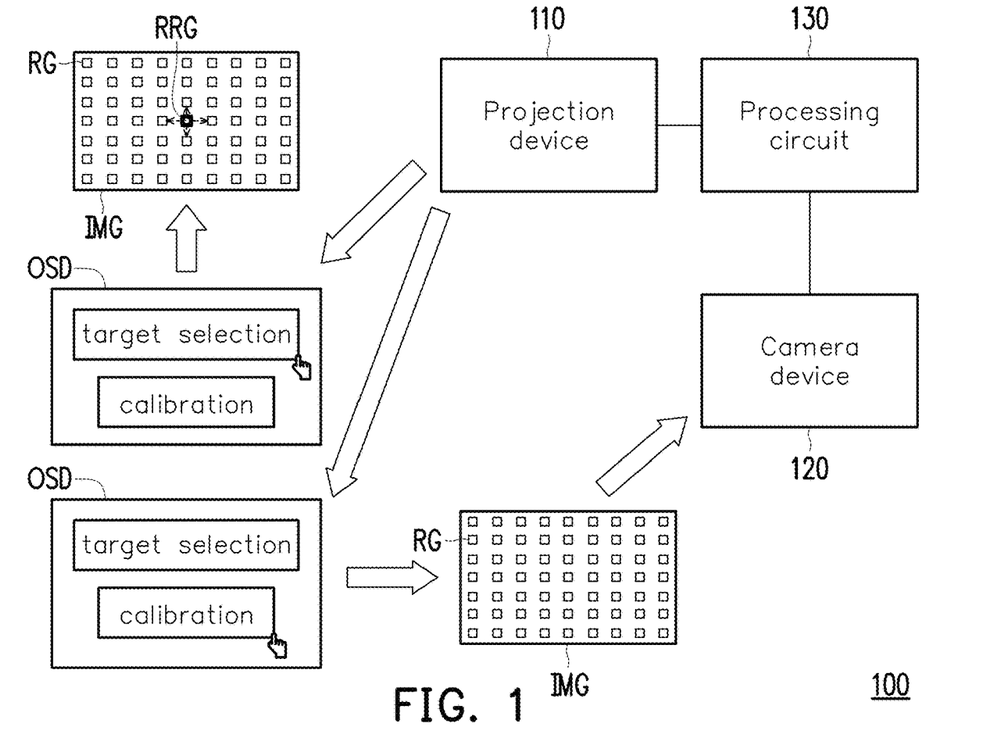
FIG. 1 is a schematic view of a circuit block of a projection system according to an embodiment of the invention.

FIG. 1 is a schematic view of a circuit block of a projection system 100 according to an embodiment of the invention. In the embodiment shown in FIG. 1, the projection system 100 includes a projection device 110, a camera device 120, and a processing circuit 130. The processing circuit 130 is coupled to the projection device 110 and the camera device 120. After the projection system 100 turns on a calibration mode, the projection device 110 is configured to project a calibration projection image IMG onto a projection target (not shown), such as a wall or a projection screen. The calibration projection image IMG includes a plurality of calibration regions RG. The number of the calibration regions RG in one calibration projection image IMG may be determined according to the actual design. In addition, the layout of the calibration regions RG in the calibration projection image IMG may also be determined according to the actual design.

Each of the calibration regions RG has at least one color gain value. For instance, in some embodiments, each calibration region RG may have a red color gain value, a green color gain value, and a blue color gain value. The processing circuit 130 may adjust red, green, and blue pixel data (e.g., red, green, and blue color values) according to the red, green, and blue color gain values and then provide the red, green, and blue pixel data adjusted by the processing circuit 130 to the projection device 110. A background color of the calibration projection image IMG may be a first color, and a color of the calibration regions RG may be a second color. The first color and the second color may be determined according to actual design. For instance, in some embodiments, the first color and the second color may be the same color.

In other embodiments, the first color may be different from the second color. For instance, according to the actual design, the background color of the calibration projection image IMG may be black, and the color of the calibration region RG may be white.

The camera device 120 is configured to capture the calibration projection image IMG on the projection target and transmit the captured image to the processing circuit 130. The captured image includes the calibration projection image IMG. The processing circuit 130 performs a color calibration operation on the calibration projection image IMG of the received captured image to calibrate color uniformity of the calibration projection image IMG. The higher the color uniformity is, the more the calibration regions RG of the calibration projection image IMG have the same color value.

Figure 2:
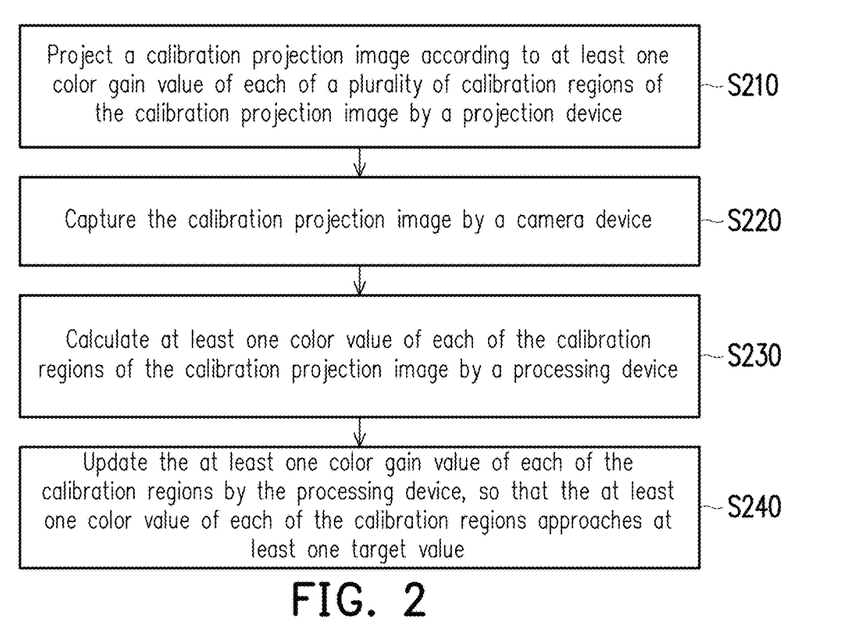
FIG. 2 is a schematic flowchart of a color calibration method of a projection system according to an embodiment of the invention.

FIG. 2 is a schematic flowchart of a color calibration method of the projection system 100 according to an embodiment of the invention. Please refer to both FIG. 1 and FIG. 2. The projection system 100 performs a color calibration operation through the processing device 130 to calibrate the color uniformity of the calibration projection image IMG of the projection device 110. Based on the actual design, in some embodiments, the processing circuit 130 also initializes the color gain value of each of the calibration regions RG before performing the color calibration operation. The color calibration operation includes steps S210 to S240.

In step S210, the projection device 110 may project the calibration projection image IMG according to at least one color gain value of each of the calibration regions RG of the calibration projection image IMG; at this time, the color gain value of each of the calibration regions RG is an initial color gain value which has not been adjusted yet. In step S220, the camera device 120 may capture the calibration projection image IMG on the projection target and transmit the captured image (the calibration projection image IMG) to the processing circuit 130. Based on an image recognition technology or other technologies, the processing circuit 130 may locate the calibration regions RG of the calibration projection image IMG. In step S230, the processing device 130 may calculate the at least one color value of each of the calibration regions RG of the calibration projection image IMG. In step S240, the processing device 130 may update the at least one color gain value of each of the calibration regions RG, so that the at least one color value of each of the calibration regions RG approaches at least one target value. The processing circuit 130 may compare the at least one target value with the at least one color value of each of the calibration regions RG to determine whether to end the color calibration operation.

According to actual design, the processing circuit 130 may be implemented in form of hardware, firmware, software (i.e., a program), or a combination of two or more of the above. In terms of hardware, the processing circuit 130 may be implemented in form of a logic circuit on an integrated circuit. Relevant functions of the processing circuit 130 as the hardware may be implemented as hardware description languages (such as Verilog HDL or VHDL) or other suitable programming languages. For instance, the relevant functions of the processing circuit 130 may be implemented in one or more microcontrollers, microprocessors, application-specific integrated circuits (ASICs), digital signal processors (DSPs), field programmable gate array (FPGA), and/or various logic blocks, modules, and circuits in other processing units.

In terms of software and/or firmware, relevant functions of the processing circuit 130 may be implemented as programming codes. For instance, the relevant functions of the processing circuit 130 may be implemented as general programming languages (such as C, C++, or assembly languages) or other suitable programming languages. The programming codes may be recorded/stored in a "non-transitory computer readable medium". In some embodiments, the non-transitory computer-readable medium includes, for instance, a read-only memory (ROM), a tape, a disk, a card, a semiconductor memory, a programmable logic circuit, and/or a storage device. The storage device includes a hard disk drive (HDD), a solid-state drive (SSD), or other storage devices. A central processing unit (CPU), a controller, a microcontroller, or a microprocessor may read and execute the programming codes from the non-transitory computer readable medium, thereby realizing the relevant functions of the processing circuit 130. In other embodiments, the processing circuit 130 is, for instance, a smart phone or a computer.

The processing circuit 130 is configured to obtain RGB color values (red color value, green color value, blue color value) of each calibration region RG in the calibration projection image IMG on the projection target through the camera device 120 and specify the target value described in step S240 to update the color gain values of the calibration regions RG, so as to automatically adjust the color uniformity of the entire projection image. The processing circuit 130 may repeat the steps of obtaining the values through the camera device 120 and performing the calibration operation in an iterative manner, and the color calibration operation is not completed until the processing circuit 130 determines that a ratio of the RGB color values of the projection image is closest to that of the specified target value. The iterative manner is to repeat the steps in order to approach and reach the desired target or result. The repeated process is referred to as "iteration", and the result of each iteration will serve as an initial value of the next iteration.

The method of determining the target value in step S240 may be arranged according to actual design. For instance, in some embodiments, the projection system 100 may have a user interface (not shown in FIG. 1) configured to provide an operation interface for inputting the target value. The user interface is coupled to the processing circuit 130 to provide the target value.

Figure 3:
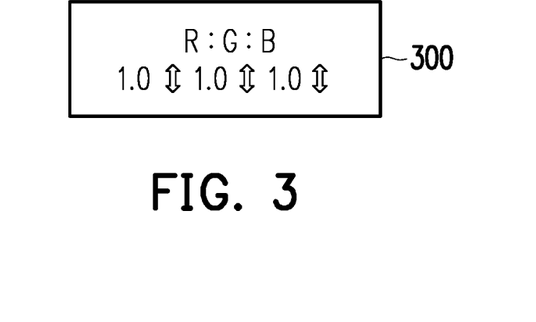
FIG. 3 is a schematic view illustrating a method of selecting a target value provided by a user interface according to an embodiment of the invention.

FIG. 3 is a schematic view illustrating a method of selecting a target value provided by a user interface 300 according to an embodiment of the invention. In the embodiment shown in FIG. 3, "R" represents a red target value, "G" represents a green target value, and "B" represents a blue target value. The user interface 300 shown in FIG. 3 may provide an operation interface, which allows the user to manually input the ratio of the specified RGB target values. Alternatively, the user may use other measurement tools (or programs) to obtain the ratio of the RGB color values of a target region (one calibration region RG of the calibration projection image IMG) and then manually input the ratio of the RGB color values to the user interface 300 shown in FIG. 3.

Figure 4:
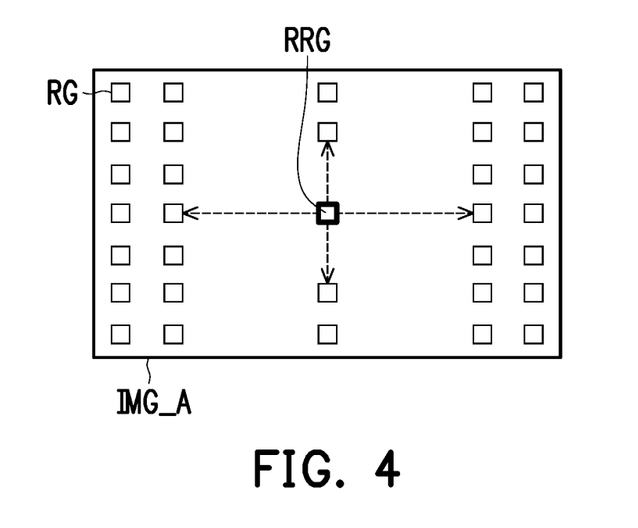
FIG. 4 is a schematic view of a calibration projection image according to another embodiment of the invention.

FIG. 4 is a schematic view of a calibration projection image IMG_A according to another embodiment of the invention. The calibration projection image IMG_A shown in FIG. 4 may be deduced by analogy from the relevant descriptions of the calibration projection image IMG shown in FIG. 1. In the embodiment shown in FIG. 4, the calibration projection image IMG A may have 33 calibration regions RG, and the arrangement thereof is shown in FIG. 4. The projection system 100 may have a user interface (not shown in FIG. 1) to provide an operation interface for selecting one of the calibration regions RG shown in FIG. 4 as a reference calibration region RRG. The user interface is coupled to the processing circuit 130 to provide selected results. The processing circuit 130 may calculate at least one color value (e.g., the RGB color value) of the reference calibration region RRG. According to the actual design, in some embodiments, the processing circuit 130 may apply the color value of the reference calibration region RRG as the target value. Through selection, the user may determine the color value of the selected calibration region RG which resembles the image uniformity performance (the color value). The embodiment shown in FIG. 4 meets the actual application requirements and thus enhances user's experience.

Figure 5:
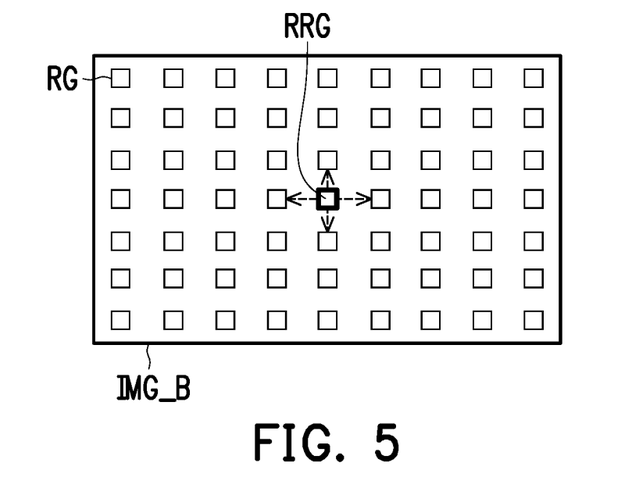
FIG. 5 is a schematic view of a calibration projection image according to another embodiment of the invention.

FIG. 5 is a schematic view of a calibration projection image IMG_B according to another embodiment of the invention. The calibration projection image IMG_B shown in FIG. 5 may be deduced by analogy from the relevant descriptions of the calibration projection image IMG_A shown in FIG. 4. Different from the calibration projection image IMG_A shown in FIG. 4, the calibration projection image IMG_B provided in the embodiment shown in FIG. 5 may have 9*7 calibration regions RG. Through selection, the user may determine the color value of the selected calibration region RG which resembles the image uniformity performance (the color value). The embodiment shown in FIG. 5 also meets the actual application requirements and thus enhances the user's experience.

The function of adjusting the color uniformity in the color calibration operation may be automatically performed through an on-screen display (OSD) or an application program. Here, for instance, if the target region of the calibration regions RG is selected through the OSD, the OSD menu may have options of "target selection" "calibration" and so on. After choosing the option of "target selection", the projection device 110 may project the calibration projection image IMG for the user to select one of the calibration regions RG as the reference calibration region. According to the actual design, in some embodiments, each calibration region RG is a non-solid geometric region, and the calibration regions RG are spaced apart from each other. For instance, the outer contour of each calibration region RG may have a circular or rectangular shape, which should however not be construed as a limitation to the invention. It is assumed that the background color of the calibration projection image IMG may be white, the color of the outer contour of the calibration regions RG may be black, and the color inside the outer contour of the calibration regions RG may be white, which should however not be construed as a limitation to the invention. In other embodiments, each calibration region RG may be a solid grid point covering a small range of the calibration projection image IMG. The user may use the up, down, left, and right buttons on the operation interface to move (switch) the calibration region RG to be selected. Once the user selects one of the calibration regions RG, it indicates that the selected calibration region RG serves as the reference calibration region. That is, the ratio of the RGB color values (red, green, and blue color values) in this reference calibration region may serve as the calibration target value. For instance, in some embodiments, the processing circuit 130 may calculate an average value of the red color values, an average value of the green color values, and an average value of the blue color values in the reference calibration region and then obtain a ratio of the three average values as the calibration target value.

Then, after choosing the option of "calibration" of the OSD menu, the projection device 110 may project the calibration projection image IMG, and the camera device 120 captures the calibration projection image IMG. It is assumed that the background color of the calibration projection image IMG may be black, and the color of the calibration regions RG may be white, which should however not be construed as a limitation to the invention. The calibration projection image IMG is used to achieve two functions. One is that the processing circuit 130 may map coordinates of the calibration regions RG (in the calibration projection image IMG of the projection target) in a coordinate system of the projection device 110 to a coordinate system of the camera device 120; the other is that the camera device 120 may accurately obtain the ratio of the RGB color values (red, green, and blue color values) of the calibration regions RG through the black background of the calibration projection image IMG and then perform iterative approximation and calibration operations to approach the target value. If the calibration operation is completed, a window is popped up on the OSD to inform the user. If it is unable to approach the target value through the iterative approximation operation (e.g., cannot reach the target difference value, or images of certain regions cannot be obtained), the OSD displays a warning message (for instance, a message of calibration failure) for the user's reference. The user may, after adjustment, perform an automatic color calibration operation again.

In an embodiment, before the automatic color calibration operation, i.e., before the projection device 110 projects the calibration projection image IMG, the projection system 100 may optionally perform a parameter setting operation on the camera device 120 (e.g., a camera) first, so as to ensure the images obtained in different environments remain consistent. According to actual design, camera parameters include exposure time, white balance, and/or other parameters. For instance, the ratio of the RGB color values (red, green, and blue color values) obtained by the camera device each time is consistent with the predetermined target value. The camera parameter setting operation is shown in FIG. 6.

Figure 6:
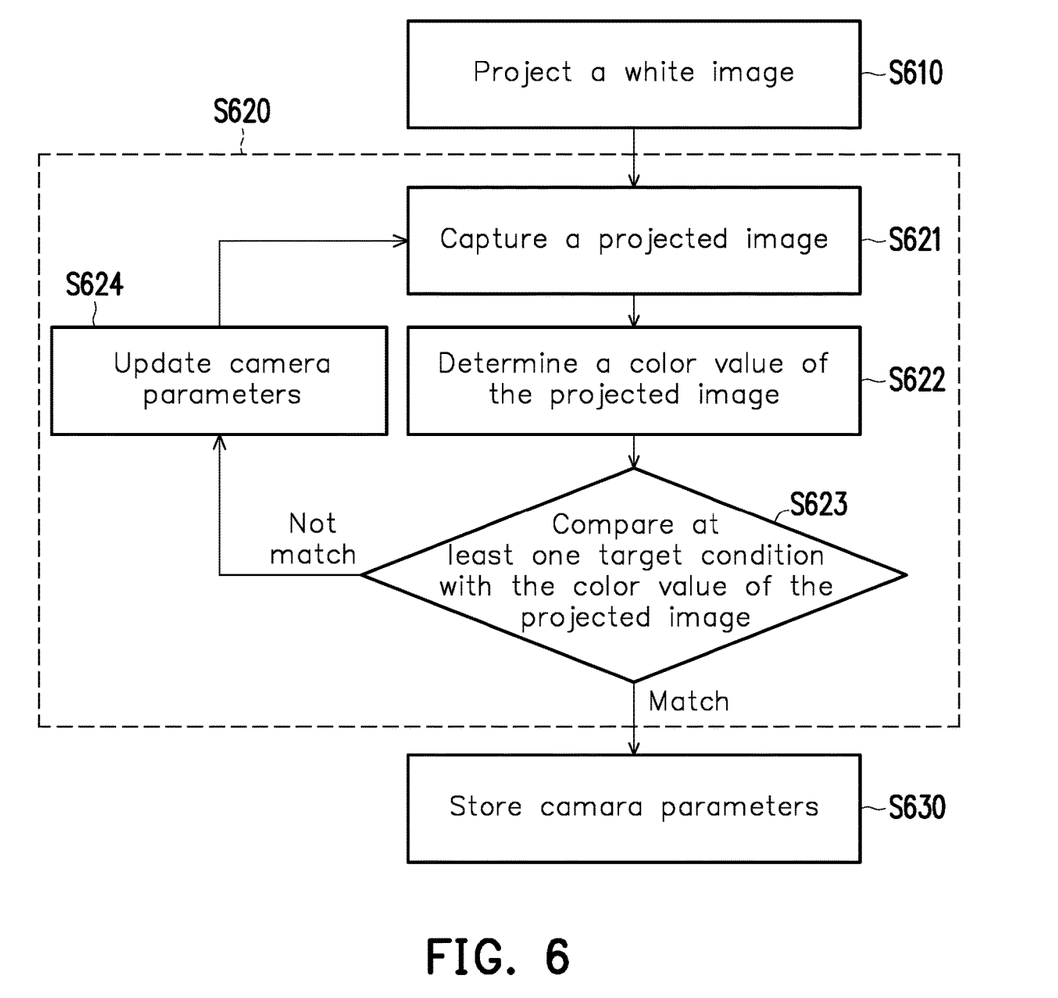
FIG. 6 is a schematic flowchart of a parameter setting method of a camera device according to an embodiment of the invention.

FIG. 6 is a schematic flowchart of a parameter setting method of the camera device 120 according to an embodiment of the invention. With reference to FIG. 1 and FIG. 6, in step 5610, the projection device 110 may project a white image as a projected image on the projection target, the camera device 120 captures the projected image on the projection target, and the processing circuit 130 may perform an iteration setting operation on camera parameters of the camera device 120 (step S620). After the iteration setting operation is completed, the camera parameters may be stored in the camera device 120 or the processing circuit 130 (step S630). The processing circuit 130 may perform a color calibration operation (e.g., the color calibration operation shown in FIG. 2 or FIG. 7) to calibrate the color uniformity of the projected image.

In the embodiment shown in FIG. 6, step S620 may include step S621, step S622, step S623, and step S624. In step S621, the processing circuit 130 may drive the camera device 120 to capture the projected image on the projection target. In step S622, the processing device 130 may determine a color value of the projected image. The processing device 130 may update at least one camera parameter of the camera device 120, so that at least one color value of the projected image approaches at least one target condition, and the at least one target condition is, for instance, a color value condition predetermined by the user. In step S623, the processing circuit 130 may compare the at least one target condition with the color value of the projected image to determine whether to end the iteration setting operation. When the color value of the projected image does not match the target condition (i.e., the determination result of step S623 is "not match"), the processing circuit 130 may perform step S624. In step S624, the processing device 130 may update the camera parameters of the camera device 120. After step S624 is completed, the processing device 130 may return to step S621 to perform the iteration setting operation. When the color value of the projected image matches the target condition (i.e., the determination result of step S623 is "match"), the processing circuit 130 may perform step S630.

Figure 7:
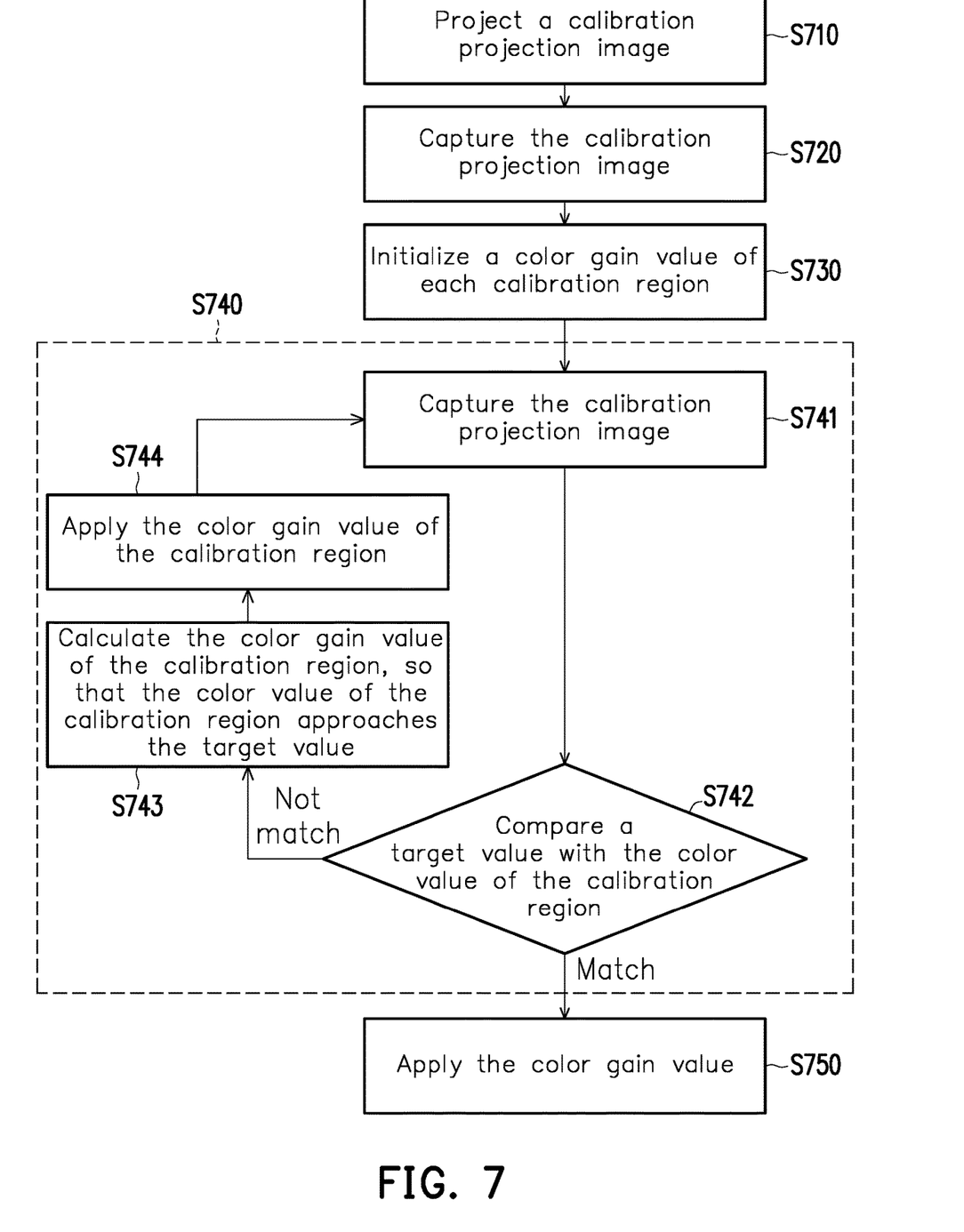
FIG. 7 is a schematic flowchart of a color calibration method of a projection system according to another embodiment of the invention.

FIG. 7 is a schematic flowchart of a color calibration method of the projection system 100 according to another embodiment of the invention. With reference to FIG. 1 and FIG. 6, in step S710, the projection device 110 may project a calibration projection image IMG. The calibration projection image IMG includes a plurality of calibration regions RG. A background color of the calibration projection image IMG may be black, and a color of the calibration regions RG may be white. In step S720, the camera device 120 may capture the calibration projection image IMG and transmit the captured image (the calibration projection image IMG) to the processing circuit 130. Therefore, the processing circuit 130 may locate the calibration regions RG of the calibration projection image IMG, i.e., calculate the position of each calibration region RG.

In step S730, the processing circuit 130 may initialize a color gain value of each of the calibration regions RG and then drive the projection device 110 to project the calibration projection image IMG. For instance, the red, green, and blue color gain values of each of the calibration regions RG may be initialized to "1, 1, 1". Therefore, the processing circuit 130 may perform a color calibration operation (step S740) to calibrate the color uniformity of the calibration projection image IMG. The background color of the calibration projection image IMG may be black, and the color of the calibration regions RG may be white. In step S740, the processing circuit 130 may drive the camera device 120 to capture the calibration projection image IMG. The processing circuit 130 may compare a target value with the color value of each of the calibration regions RG to determine whether to end the color calibration operation. In the color calibration operation (step S740), the processing circuit 130 may take the color value of the specified reference calibration region as the target value and then determine the color gain value of each calibration region RG according to the correlation between the target value and the color values of the calibration regions RG, so as to calibrate the color of the projection image. The color calibration operation is repeated in an iterative manner until the ratio of the RGB color value of each calibration region RG is close to the target value.

In the embodiment shown in FIG. 7, step S740 may include step S741, step S742, step S743, and step S744. In step S741, the processing circuit 130 may drive the camera device 120 to capture the calibration projection image IMG. In step S742, the processing device 130 may compare the target value with the color value of the calibration region RG. When the color value of the calibration region RG matches the target value (i.e., the determination result of step S742 is "match"), the processing circuit 130 may end the color calibration operation and proceed to step S750.

The determination method of step S742 may be performed according to the actual design. For instance, in some embodiments, the determination method of step S742 may be "a determination based on a comparison with a fixed predetermined value". The target value may be set as a fixed difference value or a fixed difference ratio. For instance, the processing circuit 130 may set the method of "determining the difference between each color value and the target value" as the determination based on a comparison with the fixed difference value or the fixed difference ratio. For instance, the RGB fixed difference ratio is set as 1%, or the fixed difference is set as 2 (choosing one of the two). If the ratio of the RGB color values obtained by capturing the image (in step S741) after adjustment is R:G:B=200:199:201, the maximum difference value is 2 (converted to a ratio of 2/200=1%). Therefore, the processing circuit 130 may determine in step S742 that the target value is matched and then perform the application operation in step S750.

In other embodiments, the determination method of step S742 may be "dynamic adjustment and determination". The target value (the difference value or the difference ratio) may be adjusted dynamically. According to the result of iterative approximation operations performed for certain number of times (e.g., the predetermined number of times is 5), the best approximation result is determined as the numerical difference value for final adjustment. The adjusted numerical difference value and the adjusted value of each iterative approximation operation are recorded. After performing the iterative approximation operations for the predetermined number of times, the processing circuit 130 may determine and compare whether each adjusted value leads to the decrease in the difference value or the difference ratio (i.e., the color uniformity of the calibration projection image increases). If the new target value obtained during the iterative approximation operation is better than the previous target value, the new target value is applied. If there is no better approximation result, the previous target value is applied.

When the color value of the calibration region RG does not match the target value (i.e., the determination result of step S742 is "not match"), the processing circuit 130 may perform step S743. In step S743, the processing device 130 may calculate the color gain value of the calibration region RG, so that the color value of the calibration region RG approaches the target value. In step S744, the processing device 130 may apply the color gain value of the calibration region RG. After step S744 is completed, the processing device 130 may return to step S741 to perform the iterative operation.

After the color calibration operation (step S740) is completed, the processing circuit 130 may apply the color gain value (step S750). The color gain value of region between two adjacent calibration regions RG may be adjusted by applying a linear gradient method, so that the projection device 110 may, after adjustment, project the entire projection image with almost the same color uniformity as the target value; as such, the color uniformity of the entire projection image may be improved, and the presentation of the projection image is optimized.

To sum up, the projection system provided in one or more embodiments of the invention may project the calibration projection image through the projection device, capture the calibration projection image through the camera device, and perform the color calibration operation through the processing circuit to calibrate the color uniformity of the calibration projection image. Thereby, the projection system may automatically and adaptively calibrate the color uniformity of the projection image projected by the projection device.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present invention is intended to be dedicated to the public regardless of whether the element or component is explicitly recited in the following claims.

What is claimed is:

1. A projection system, comprising a projection device, a camera device, and a processing circuit, wherein the projection device is configured to project an on-screen display (OSD) menu, wherein the OSD menu comprises options of target selection and calibration;

after the option of target selection is chosen, the projection device projects a projection image having a plurality of regions, one of the plurality of regions of the projection image is configured to be selected as a reference calibration region, and at least one color value of the reference calibration region serves as at least one target value;

after the option of calibration is chosen, the projection device projects a calibration projection image, the calibration projection image comprises a plurality of calibration regions, wherein the plurality of calibration regions of the calibration projection image respectively correspond to the plurality of regions of the projection image, the camera device is configured to capture the calibration projection image to form a captured image, and the processing circuit is coupled to the projection device and the camera device and configured to perform a color calibration operation to calibrate color uniformity of the calibration projection image, wherein the processing circuit drives the projection device to project the calibration projection image according to at least one color gain value of each of the calibration regions, drives the camera device to capture the calibration projection image to form the captured image and calculates at least one color value of each of the calibration regions of the calibration projection image in the captured image, and updates the at least one color gain value of each of the calibration regions to the projection device, so that the at least one color value of each of the calibration regions of an entire projection image projected by the projection device approaches the at least one target value, wherein a color of a background of the calibration projection image is black, a color of the calibration regions is white, and the processing circuit does not calculate any color value of the background of the calibration projection image in the captured image.

2. The projection system according to claim 1, wherein the processing circuit compares the at least one target value with the at least one color value of each of the calibration regions in the captured image to determine whether to end the color calibration operation.

3. The projection system according to claim 1, wherein the processing circuit is configured to calculate positions of the calibration regions of the calibration projection image in the captured image.

4. The projection system according to claim 1, wherein the processing circuit is further configured to initialize the at least one color gain value of each of the calibration regions and then perform the color calibration operation to calibrate the color uniformity of the calibration projection image.

5. The projection system according to claim 1, wherein before the projection device projects the calibration projection image, the processing circuit performs an iteration setting operation on the camera device, and after the iteration setting operation ends, the processing circuit performs the color calibration operation to calibrate color uniformity of a projected image.

6. The projection system according to claim 5, wherein the iteration setting operation comprises: driving the camera device to capture the projected image, determining at least one color value of the projected image by the processing circuit, and updating at least one camera parameter of the camera device, so that the at least one color value of the projected image approaches at least one target condition.

7. The projection system according to claim 6, wherein the processing circuit compares the at least one target condition with the at least one color value of the projected image to determine whether to end the iteration setting operation.

8. The projection system according to claim 1, wherein the projection system further comprises a user interface coupled to the processing circuit and configured to provide an operation interface for inputting the at least one target value.

9. A color calibration method of a projection system, comprising:
performing a color calibration operation by a processing device to calibrate color uniformity of a calibration projection image of a projection device, wherein the color calibration operation comprises:
driving the projection device to project an on-screen display (OSD) menu, wherein the OSD menu comprises options of target selection and calibration;
after the option of target selection is chosen, driving the projection device to project a projection image having a plurality of regions, wherein one of the plurality of regions of the projection image is selected as a reference calibration region, and at least one color value of the reference calibration region serves as at least one target value;
after the option of calibration is chosen, driving the projection device to project the calibration projection image according to at least one color gain value of each of a plurality of calibration regions of the calibration projection image, driving a camera device to capture the calibration projection image to form a captured image, calculating at least one color value of each of the calibration regions of the calibration projection image in the captured image, wherein the plurality of calibration regions of the calibration projection image respectively correspond to the plurality of regions of the projection image; and
updating the at least one color gain value of each of the calibration regions to the projection device, so that the at least one color value of each of the calibration regions of an entire projection image projected by the projection device approaches the at least one target value,
wherein a color of a background of the calibration projection image is black, a color of the calibration regions is white, and any color value of the background of the calibration projection image in the captured image is not calculated.

10. The color calibration method according to claim 9, further comprising:
comparing the at least one target value with the at least one color value of each of the calibration regions in the captured image to determine whether to end the color calibration operation.

11. The color calibration method according to claim 9, further comprising:
calculating positions of the calibration regions in the calibration projection image in the captured image by the processing device.

12. The color calibration method according to claim 9, further comprising:
initializing the at least one color gain value of each of the calibration regions and performing the color calibration operation to calibrate the color uniformity of the calibration projection image.

13. The color calibration method according to claim 9, further comprising:
performing an iteration setting operation on the camera device before the projection device projects the calibration projection image; and
after the iteration setting operation ends, performing the color calibration operation to calibrate color uniformity of a projected image.

14. The color calibration method according to claim 13, wherein the iteration setting operation comprises:
capturing the projected image by the camera device;

determining at least one color value of the projected image by the processing device; and updating at least one camera parameter of the camera device, so that the at least one color value of the projected image approaches at least one target condition.

15. The color calibration method according to claim 14, further comprising:

comparing the at least one target condition with the at least one color value of the projected image to determine whether to end the iteration setting operation.

16. The color calibration method according to claim 9, further comprising:

providing an operation interface through a user interface of the projection device to input the at least one target value.

* * * * *